United States Patent
Kim et al.

(10) Patent No.: US 10,378,488 B2
(45) Date of Patent: Aug. 13, 2019

(54) METHOD OF REMOVING IMPURITIES FROM EGR BY AIR BLOWING, EGR SYSTEM, AND VEHICLE INCLUDING THE SAME

(71) Applicant: Hyundai Motor Company, Seoul (KR)

(72) Inventors: Dong-Sun Kim, Seoul (KR); Young-Sun Nam, Hwaseong-si (KR); Min-Kyu Won, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 192 days.

(21) Appl. No.: 15/358,088

(22) Filed: Nov. 21, 2016

(65) Prior Publication Data

US 2018/0045144 A1 Feb. 15, 2018

(30) Foreign Application Priority Data

Aug. 10, 2016 (KR) .................. 10-2016-0101832

(51) Int. Cl.
| | |
|---|---|
| *F02B 33/44* | (2006.01) |
| *F02M 26/34* | (2016.01) |
| *F02M 26/04* | (2016.01) |
| *F02M 26/15* | (2016.01) |
| *F02M 26/22* | (2016.01) |
| *F02B 37/12* | (2006.01) |
| *F02D 41/00* | (2006.01) |
| *F02B 37/16* | (2006.01) |

(Continued)

(52) U.S. Cl.
CPC .............. *F02M 26/34* (2016.02); *F02B 37/12* (2013.01); *F02B 37/164* (2013.01); *F02D 41/0007* (2013.01); *F02D 41/0077* (2013.01); *F02M 26/04* (2016.02); *F02M 26/06* (2016.02); *F02M 26/07* (2016.02); *F02M 26/15* (2016.02); *F02M 26/22* (2016.02); *F02M 26/50* (2016.02); *F02B 47/08* (2013.01); *F02D 41/0065* (2013.01); *F02D 41/123* (2013.01); *F02D 2200/0406* (2013.01); *Y02T 10/144* (2013.01)

(58) Field of Classification Search
CPC ........... F02M 26/06; F02M 26/50; F28G 1/16
USPC ....................... 60/605.2; 123/568.11, 568.12
See application file for complete search history.

(56) References Cited

U.S. PATENT DOCUMENTS

| 4,146,986 A * | 4/1979 | Kohama ................... F01N 3/22 60/278 |
| 6,216,458 B1 * | 4/2001 | Alger ........................ F01N 3/02 123/568.12 |

(Continued)

FOREIGN PATENT DOCUMENTS

| JP | H 10141151 A | 5/1998 |
| JP | 2009-501875 A | 1/2009 |

(Continued)

*Primary Examiner* — Ngoc T Nguyen
(74) *Attorney, Agent, or Firm* — Morgan, Lewis & Bockius LLP

(57) ABSTRACT

A method of removing impurities from EGR by air blowing may include performing an air-blowing mode in which, when a current intake system pressure detected by a controller exceeds a target intake system pressure in an intake system, in which a mixture is supplied to an engine, a portion of the mixture, serving as compressed air, flows into an EGR path, through which a portion of exhaust, serving as EGR gas and flowing in the intake system and an exhaust system connected to the intake system, is supplied to the engine.

14 Claims, 5 Drawing Sheets

(51) Int. Cl.
    *F02M 26/06*     (2016.01)
    *F02M 26/50*     (2016.01)
    *F02M 26/07*     (2016.01)
    *F02B 47/08*     (2006.01)
    *F02D 41/12*     (2006.01)

(56) References Cited

U.S. PATENT DOCUMENTS 6,470,864 B2 * 10/2002 Kim ................ F02B 37/005
                                                                     123/568.12
9,316,180 B2 * 4/2016 Heiermann ............ F02M 26/05

FOREIGN PATENT DOCUMENTS

JP        2010-071186 A     4/2010
JP       WO 2015162779 A1 * 10/2015 ............. F02M 26/00
KR     10-2016-0044767     4/2016

\* cited by examiner

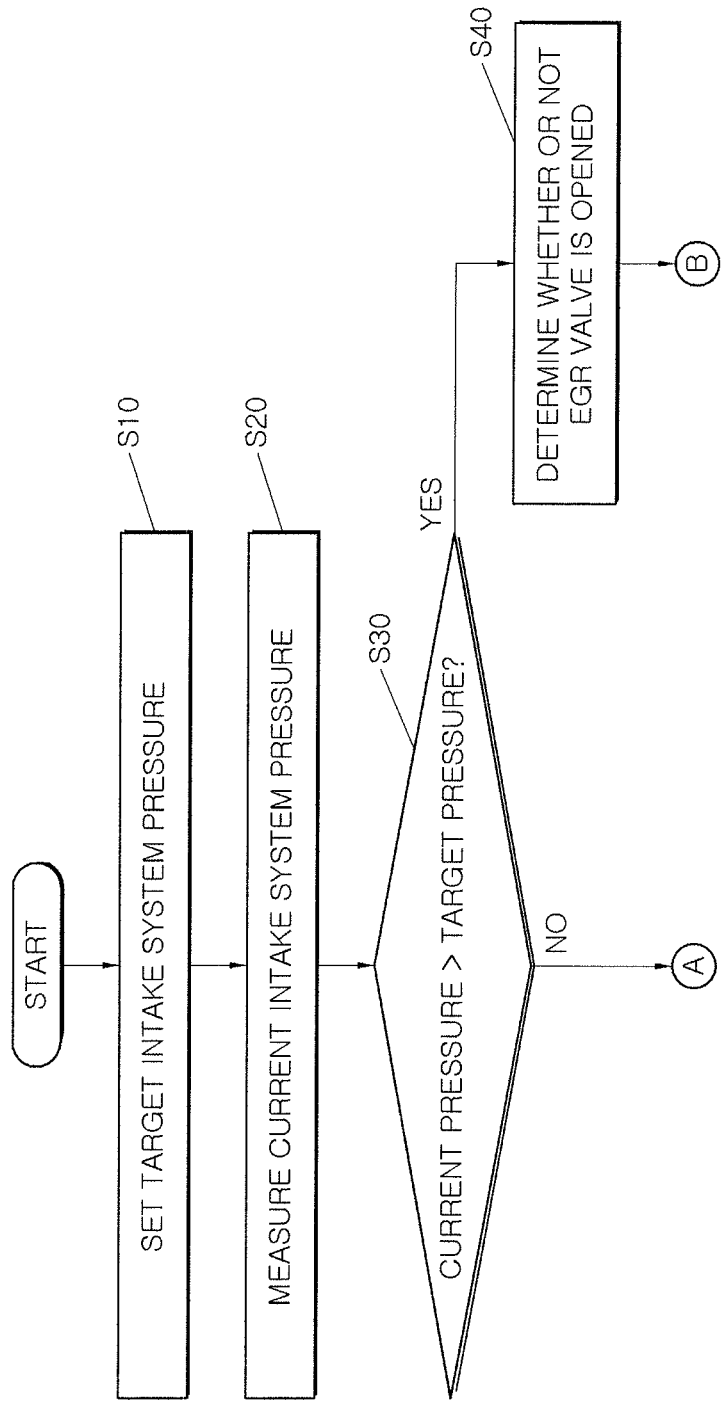

METHOD OF REMOVING IMPURITIES FROM EGR BY AIR BLOWING, EGR SYSTEM, AND VEHICLE INCLUDING THE SAME

CROSS-REFERENCE TO RELATED APPLICATIONS

The present application claims priority to Korean Patent Application No. 10-2016-0101832, filed on Aug. 10, 2016, the entire contents of which is incorporated herein for all purposes by this reference

BACKGROUND OF THE INVENTION

Field of the Invention

Exemplary embodiments of the present invention relate to an exhaust gas recirculation (EGR) system; and, particularly, to a method of removing impurities from EGR by air blowing using compressed air, and a vehicle to which an EGR system is applied.

Description of Related Art

In recent years, the increasing demand for improvement in fuel efficiency has also been applied to a vehicle equipped with an engine which is downsized and has small displacement. Here, the small displacement engine refers to an engine which reduces displacement and prevents a loss of power by adopting a direct injection system in order to further improve fuel efficiency compared to engines having the same performance.

Due to the demand for improvement in fuel efficiency, the vehicle with the small displacement engine is also equipped with an Exhaust Gas Recirculation (EGR) system together with a turbocharger to create a synergy effect on fuel efficiency.

The EGR system includes an EGR pipe forming an EGR path in which exhaust gas flows and a portion of the exhaust gas is converted into EGR gas and flows to an intake system, an EGR valve for opening and closing the EGR path, and an EGR cooler for decreasing the temperature of EGR gas. The EGR system is classified into an HP-EGR (High-Pressure EGR) system and an LP-EGR (Low-Pressure EGR) system according to the arrangement of an EGR pipe. The HP-EGR system is a system in which EGR gas is discharged in front of a turbocharger, and the LP-EGR system is a system in which EGR gas is discharged behind a turbocharger.

The LP-EGR system is typically applied to a vehicle with a small displacement engine, and the LP-EGR system includes an EGR path, and an independent dump valve path separated from the EGR path.

In the EGR path of the LP-EGR system, exhaust gas discharged from a small displacement engine flows to the turbine of a turbocharger, intake air supplied to the engine is compressed and converted into charge air by a compressor, and at the same time a portion of the exhaust gas is converted into EGR gas and returns back to the engine. Therefore, it is possible to further improve fuel efficiency together with the performance of the small displacement engine.

In the dump valve path of the LP-EGR system, the compressed air in an intake system flows to the front end of the compressor of the turbocharger when a dump valve is opened, thereby decreasing the pressure in the intake system. Thus, when the pressure of air flowing in the intake manifold of the intake system is higher than a target pressure in an intake manifold, the compressor of the turbocharger is protected.

However, impurities such as carbon or soot generated due to exhaust gas are deposited in the EGR pipe, the EGR valve, and the EGR cooler of the LP-EGR system. Accordingly, in order to achieve an improvement in fuel efficiency identical to the performance of new EGRs, the impurities must be periodically removed.

To this end, the LP-EGR system is periodically cleaned in a chattering manner in which the EGR valve is opened/closed, in order to remove the impurities deposited in the LP-EGR system. However, this enables only impurities around the EGR valve to be removed, and the EGR pipe and the EGR cooler may be hardly cleaned.

For this reason, since the amount of impurities deposited in the EGR valve, the EGR pipe, and the EGR cooler of the LP-EGR system is increased when the vehicle travels for a long time, in spite of the periodical chattering of the EGR valve, the effective apertures thereof are reduced or they are clogged. This may cause fuel efficiency to be reduced in the LP-EGR system of the vehicle with the small displacement engine.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a method of removing impurities from EGR by air blowing, an EGR system, and a vehicle including a same, in which impurities deposited in an exhaust gas recirculation (EGR) valve, an EGR pipe, and an EGR cooler are removed using the flow of compressed air such that an intake system pressure higher than a target pressure acts on an EGR path through a dump valve path, and in particular the carbon dioxide ($CO_2$) in the EGR pipe is prevented from flowing into an intake system by applying fuel-cut as one of vehicle operating conditions when the EGR valve is opened.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with an exemplary embodiment of the present invention, a method of removing impurities from EGR by air blowing includes comparing a detected current intake system pressure with a set target intake system pressure in an intake system, in which a mixture is supplied to an engine, checking an EGR valve opening condition of an EGR valve mounted at an EGR path when the current intake system pressure exceeds the target intake system pressure, opening the EGR valve and a dump valve mounted at a dump valve path connecting the intake system to the EGR path such that compressed air flows into the EGR path, when the EGR valve opening condition is satisfied, and closing the EGR valve and opening the dump valve mounted at the dump valve path connecting the intake system to the EGR path such that the compressed air flows into the EGR path, when the EGR valve opening condition is not satisfied.

The target intake system pressure may be set in consideration of an operating condition of the engine. The current intake system pressure may be detected by a pressure sensor or in consideration of an intake system state variable. The current intake system pressure may be compared with the target intake system pressure using a size therebetween.

Fuel-cut of the engine, in which $CO_2$ of exhaust gas is not introduced into the intake system, may be applied to the EGR valve opening condition.

When the EGR valve and the dump valve are opened, the compressed air may be discharged to the intake system and the exhaust system from the EGR path, and when the EGR valve is closed and the dump valve is opened, the compressed air may be discharged to the exhaust system from the EGR path.

In accordance with another exemplary embodiment of the present invention, an EGR system includes an EGR pipe connecting an intake system, in which outside air is compressed to be a mixture and is supplied to an engine, to an exhaust system, to which exhaust gas discharged from the engine is discharged, a dump valve path connecting the intake system to the EGR pipe, an EGR valve, opening and closing of which are controlled such that the EGR pipe communicates with the intake system, a portion of the exhaust gas, serving as EGR gas, being supplied to the intake system when the EGR valve is opened, a dump valve, opening and closing of which are controlled such that the EGR pipe communicates with the dump valve path, the mixture being converted into compressed air and supplied to the EGR pipe when the dump valve is opened, and an EGR cooler mounted in the EGR pipe to control a temperature of the EGR gas.

The opening and closing of the EGR valve and the dump valve may be controlled by the engine control unit (ECU), and the engine ECU may be connected to an air-blowing map receiving the measured pressure in the intake system.

In accordance with a further embodiment of the present invention, a vehicle includes an intake system in which compressed air is supplied to an engine, an exhaust system to which exhaust gas is discharged from the engine, a turbocharger including a turbine rotated by the exhaust gas in the exhaust system, and a compressor for converting outside air in the intake system into compressed air, an EGR system configured to rotate the turbine using an EGR path in which the exhaust gas discharged from the engine flows, to supply a portion of the exhaust gas to the intake system while the exhaust gas is discharged to the exhaust system, and to prevent impurities of the exhaust from being deposited by blowing the compressed air, flowing in the intake system, into the EGR path using a dump valve path connected to the EGR path, and an engine ECU including an air-blowing map for controlling an air-blowing operation.

The connection portion of the EGR path and the intake system may be located at the front end of the compressor mounted in the intake system. The connection portion of the EGR path and the exhaust system may be located between an MCC and a UCC mounted in the exhaust system.

The intake system may be provided with a pressure sensor for detecting a pressure of the compressed air, and a value measured by the pressure sensor may be provided to the engine ECU.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

FIG. 1A and FIG. 1B are a flowchart illustrating a method of removing impurities from EGR by air blowing according to an embodiment of the present invention;

Figure 1B:
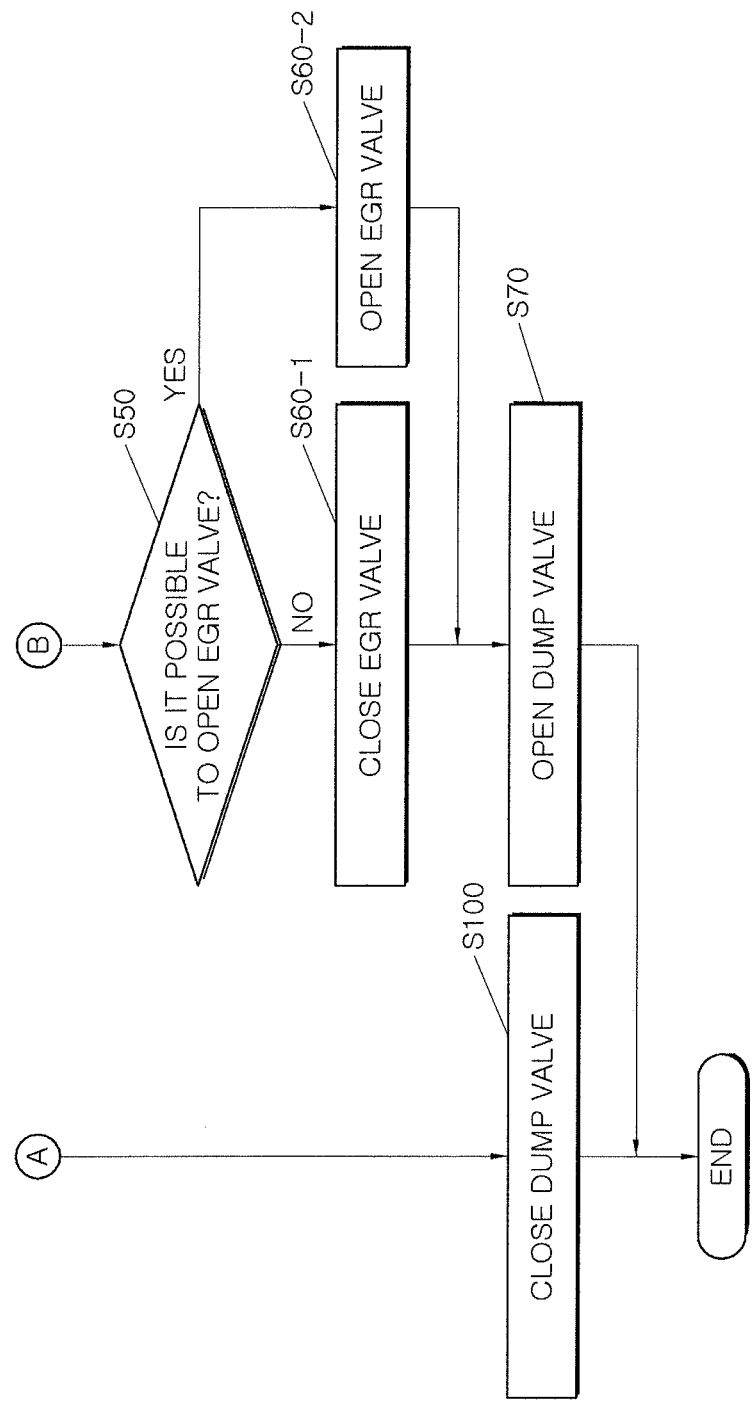

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Referring to FIG. 1A and FIG. 1B, a method of removing impurities from EGR by air blowing is performed such that a target intake system pressure is determined by an operating condition (S10), a current intake system pressure is determined by a pressure sensor or an intake system state variable (S20), the opening and closing of an EGR valve is determined by an EGR valve state variable when the current intake system pressure exceeds the target intake system pressure (S30 and S40), and a dump valve is opened by controlling the target position of the dump valve in the state in which the EGR valve is opened or closed (S60-1, S60-2, and S70).

Here, the operating condition is one of an accelerator pedal sensor stroke, an RPM (revolutions per minute) (engine speed), a gear-shift position of a transmission (P, N, R, or D), and a vehicle speed (velocity), or a combination thereof. The intake system state variable is one of an air volume (air flux), an RPM, a throttle position sensor angle, and an intake pressure (intake manifold pressure), or a combination thereof. The EGR valve state variable is one of fuel-cut (which is a method of reducing fuel consumption by stopping fuel injection when a vehicle is decelerated while traveling and is referred to as fuel cut-off), a vehicle speed, an RPM, and air volume, or a combination thereof.

Accordingly, in the method of removing impurities from EGR, when the charge pressure in an intake system becomes higher than necessary, compressed air is not discharged out of the intake system, but is blown into an EGR path using a dump valve in order to protect a compressor or the intake system, thereby removing impurities, including carbon or soot, deposited in an EGR valve, an EGR pipe, and an EGR cooler.

Figure 2:
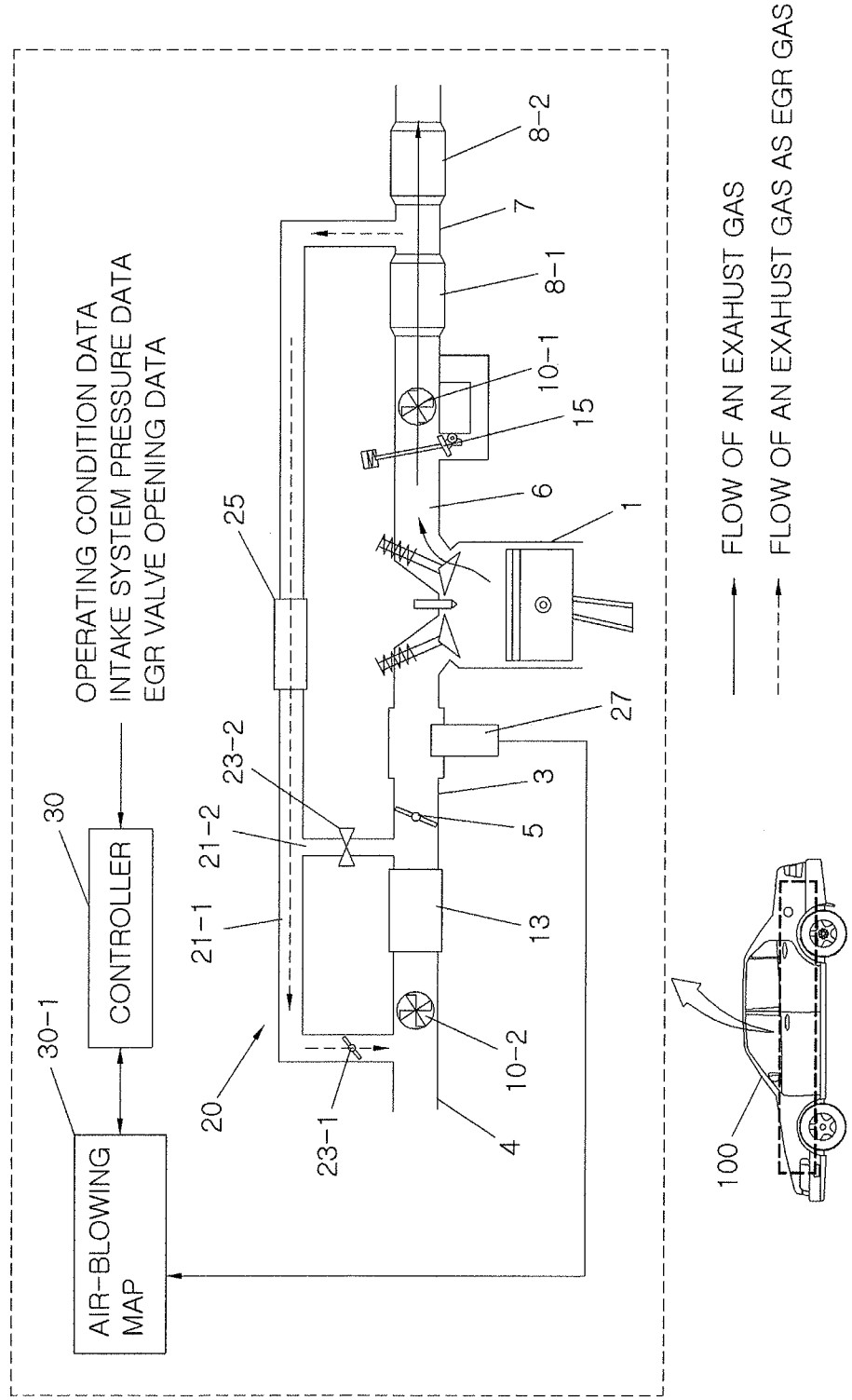
FIG. 2 is a diagram illustrating an example of a vehicle with an EGR system in which the method of removing impurities from EGR by air blowing is embodied according to the embodiment of the present invention.

FIG. 2 illustrates an example of a vehicle 100 with an EGR system 20 in which the method of removing impurities from EGR by air blowing is embodied.

As illustrated in FIG. 2, the vehicle 100 includes an intake system for supplying compressed air, an exhaust system for discharging exhaust gas from an engine 1, a turbocharger including a turbine 10-1, which is rotated by the exhaust gas in the exhaust system, and a compressor 10-2, which converts an outside air in the intake system into compressed air, an EGR system 20 configured to rotate the turbine 10-1 by exhaust gas, to supply a portion of the exhaust gas, which is converted into EGR gas, to the intake system, and to prevent impurities including carbon or soot from being deposited by air blowing using the compressed air in the intake system, and an engine ECU (Electronic Control Unit) 30 including an air-blowing map 30-1 for controlling an air-blowing operation.

In more detail, the engine 1 is a small displacement engine. In the intake system, a path in which compressed air is supplied to the engine through an intake manifold 3 and an intake 4 is formed, the flow rate of the compressed air supplied to the engine 1 is controlled by a throttle valve 5, and the temperature of the compressed air converted by the compressor 10-2 is regulated by an intercooler 13. A pressure sensor, which is located at the rear end of the throttle valve 5 in the intake manifold 3, detects the pressure of compressed air, and the detected value is provided to the air-blowing map 30-1 (or the controller 30) as input data. In the exhaust system, a path in which exhaust gas is discharged to an outside through an exhaust manifold 6 and an exhaust pipe 7 is formed, the turbine 10-1 is connected to a wastegate valve 15, and harmful substances including NOx in exhaust gas are filtered by an Manifold Catalytic Converter (MCC) 8-1 (which is a catalytic device built in the joint portion of the exhaust pipe) and a Under-floor Catalytic Converter (UCC) 8-2.

In more detail, the EGR system 20 includes an EGR pipe 21-1, a dump valve pipe 21-2, an EGR valve 23-1, a dump valve 23-2, and an EGR cooler 25. The EGR system 20 is an LP-EGR system in which EGR gas is discharged behind the turbine 10-1 of the turbocharger.

For example, the EGR pipe 21-1 connects the intake 4 to the exhaust pipe 7 to form an EGR path in which a portion of exhaust gas flows as EGR gas. The connection portion of the EGR pipe 21-1 to the exhaust pipe 7 is located between the MCC 8-1 and the UCC 8-2 such that the EGR gas is discharged from the front end of the UCC 8-2. The dump valve pipe 21-2 connects the intake 4 (or the intake manifold 3) to the EGR pipe 21-1 to form a dump valve path in which the high-pressure compressed air in the intake system is blown into the EGR pipe 21-1. The EGR valve 23-1 is mounted at the EGR pipe 21-1, and is duty-controlled by the engine ECU 30 such that the EGR path communicates with the intake 4 (or the intake manifold 3). The dump valve 23-2 is mounted at the dump valve pipe 21-2, and is duty-controlled by the engine ECU 30 such that the dump valve path communicates with the EGR path. The EGR cooler 25 is mounted at the EGR pipe 21-1 to control the temperature of EGR gas.

In more detail, the engine ECU 30 treats operating condition data, intake system pressure data, and EGR valve opening data, as input data, and outputs a duty of 0 to 100%. Therefore, the engine ECU 30 checks an accelerator pedal sensor stroke, an RPM, a gear-shift position, a vehicle speed, an air volume, a throttle position sensor angle, an intake pressure (intake manifold pressure), fuel-cut signal, etc. engine ECU 30 further includes a modeling map which is made using one of the air volume, an RPM, a throttle position sensor angle, and an intake pressure (intake manifold pressure), or a combination thereof. The air-blowing map 30-1 treats the value, detected by the pressure sensor 27, as input data and provides a same to the engine ECU 30.

However, the engine ECU 30 may be a controller which is connected to the air-blowing map 30-1 to dedicatedly control the air-blowing operation.

Hereafter, the method of removing impurities from EGR by air blowing illustrated in FIG. 1A and FIG. 1B will be described in detail with reference to FIGS. 2 to 4. In the instant case, a control performer is the engine ECU 30 connected to the air-blowing map 30-1, and subjects to be controller are the EGR valve 23-1 and the dump valve 23-2, the opening and closing of which are controlled by the engine ECU 30. Here, the engine ECU 30 and the air-blowing map 30-1 are treated as a controller 30 for convenience of description.

S10 is a step of setting a target intake system pressure by the controller 30. Referring to FIG. 2, the controller 30 treats an accelerator pedal sensor stroke, an RPM, a gear-shift position, and a vehicle speed, as operating condition data, and determines a target intake system pressure using one of them or a combination thereof.

S20 is a step of detecting a current intake system pressure by the controller 30. Referring to FIG. 2, the controller 30 receives a current intake system pressure measured by the pressure sensor 27 from the air-blowing map 30-1 or measures a current intake system pressure. In addition, the controller 30 treats the air volume, an RPM, a throttle position sensor angle, and an intake pressure (intake manifold pressure), as intake system state variable data, and measures a current intake system pressure from the modeling made using one of them or a combination thereof.

S30 is a step of determining whether the current intake system pressure exceeds the target intake system pressure by the controller 30. To this end, the controller 30 uses the relationship of "current intake system pressure>target intake system pressure". Here, since the symbol ">" is a sign of inequality indicative of the size relationship between two values, it is shown that the current intake system pressure is larger than the target intake system pressure.

As a result, when the current intake system pressure is determined to be smaller than the target intake system pressure in the relationship of "current intake system pressure>target intake system pressure", the process proceeds to S100 so that the dump valve 23-2 is maintained in a closed state. On the other hand, when the current intake system pressure is determined to be larger than the target intake system pressure, the process proceeds to S40 for air blowing.

S40 is a step of checking whether or not to open the EGR valve by the controller 30. S50 is a step of determining whether or not to open the EGR valve by the controller 30. Referring to FIG. 2, the controller 30 treats fuel-cut, the vehicle speed, an RPM, and air volume, as EGR valve state variable data, and determines whether the EGR path (the mixture (high-pressure compressed air having a pressure larger than the target intake system pressure) in the EGR pipe 21-1) adversely affects the operation of the engine 1 when the EGR valve 23-1 is opened, considering one of the above values or a combination thereof.

S60-1 is a step of controlling the EGR valve 23-1 in a closed state when it is determined that the mixture (high-pressure compressed air having a pressure larger than the target intake system pressure) adversely affects the operation of the engine 1 by the controller 30. S60-2 is a step of controlling the EGR valve 23-1 in an opened state when it is determined that the mixture (high-pressure compressed air having a pressure larger than the target intake system pressure) does not adversely affect the operation of the engine 1 by the controller 30.

S70 is a step of controlling the dump valve 23-2 in an opened state by the controller 30. In the instant case, since the EGR pipe 21-1 communicates with the dump valve pipe 21-2, a portion of the mixture (high-pressure compressed air having a pressure larger than the target intake system pressure) is injected into the EGR pipe 21-1, and the injected mixture allows air blowing to be formed in the EGR path.

Figure 3:
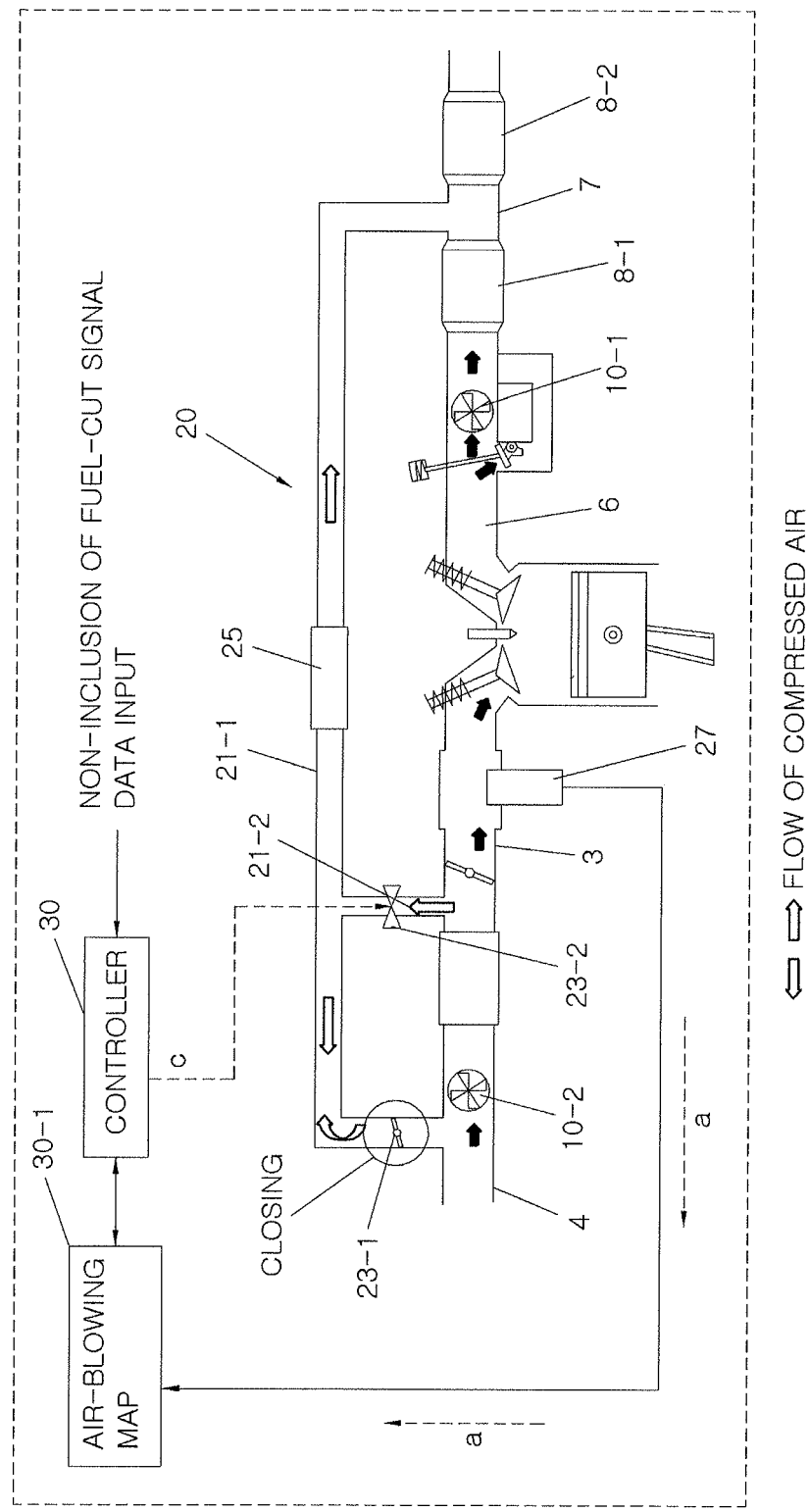
FIG. 3 is a diagram illustrating the operation of the EGR system to which fuel-cut from among vehicle operating conditions is not applied according to the embodiment of the present invention.
Figure 4:
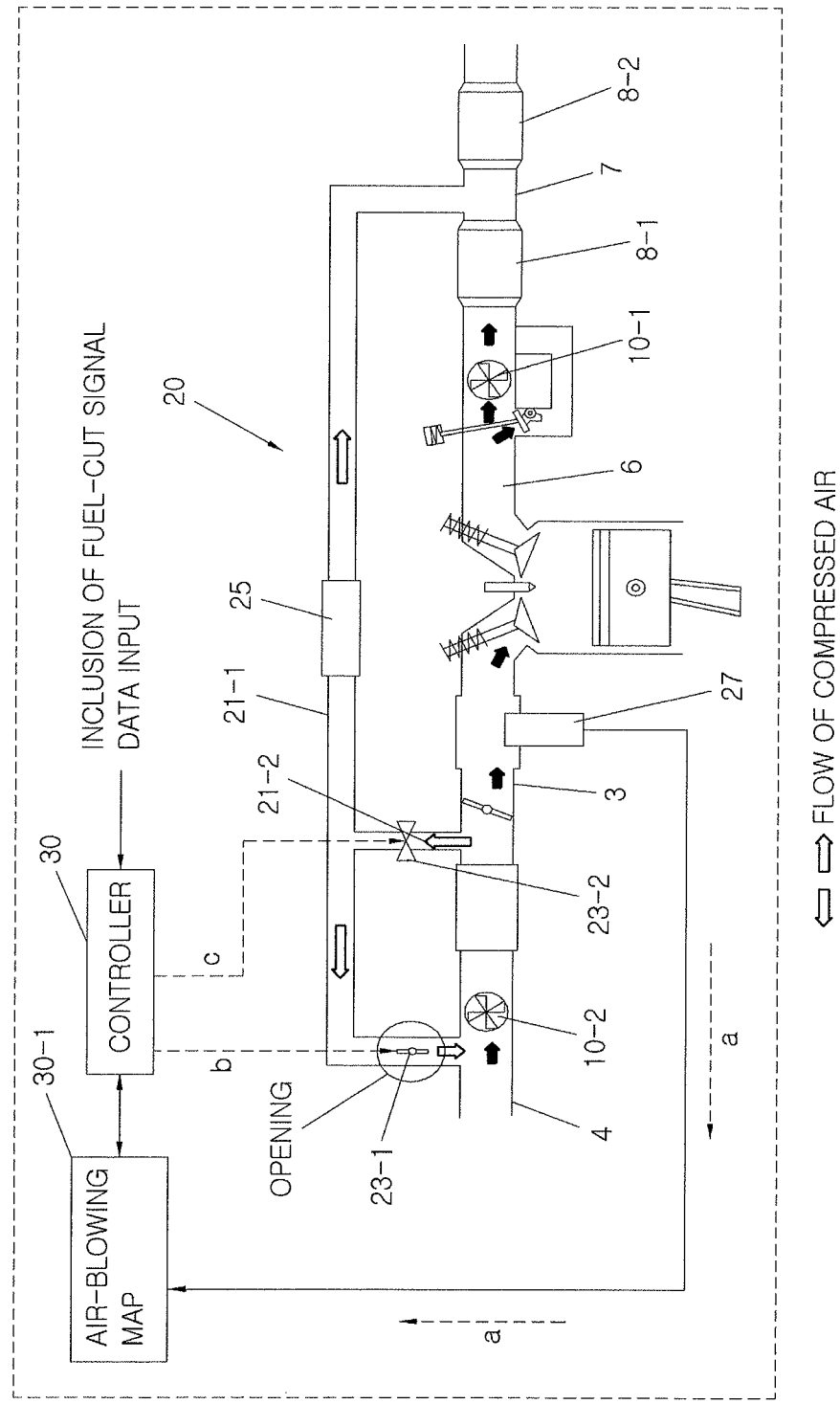
FIG. 4 is a diagram illustrating the operation of the EGR system to which the fuel-cut from among the vehicle operating conditions is applied according to the embodiment of the present invention.

Meanwhile, FIG. 3 and FIG. 4 illustrates a state in which air blowing is performed in the EGR system 20 when the EGR valve 23-1 is determined to be opened in the state of fuel-cut from among vehicle operating conditions.

In the instant case, when the dump valve 23-2 is opened in a fuel-cut state, there is no problem even though the carbon dioxide ($CO_2$) in the EGR pipe 21-1 flows into the intake system.

The opening or closing of the EGR valve 23-1 may be controlled by the controller 30 in a manner of the target position control of the EGR valve (e.g., closing→target valve position 0%, opening→target valve position 100%) or the duty control of the EGR valve (e.g., closing→valve duty control 0%, opening→valve duty control 100%). In addition, the opening or closing of the dump valve 23-2 may be controlled by the controller 30 in a manner of the target position control of the dump valve (e.g., closing→target valve position 0%, opening→target valve position 100%), the duty control of the dump valve (e.g., closing→valve duty control 0%, opening→valve duty control 100%), or the control command operation of the dump valve (e.g., closing→valve close command→valve open command). Here, the symbol "→" indicates a progress direction.

Referring to FIG. 3, the controller 30 determines that the pressure of the mixture exceeds the target intake system pressure by the detection signal (a) of the pressure sensor 27 through the air-blowing map 30-1, but does not detect the fuel-cut of the engine 1. Accordingly, a duty is controlled to be output only to the dump valve 23-2. As a result, the EGR valve 23-1 is maintained in a closed state, but the dump valve 23-2 is opened by the controlled duty. Consequently, after the mixture (high-pressure compressed air having a pressure larger than the target intake system pressure) is injected into the EGR pipe 21-1, the injected mixture is not discharged to the intake system due to the closing of the EGR valve 23-1, but is discharged to the exhaust system via the EGR cooler 25, removing carbon or soot deposited in the EGR pipe 21-1 and the EGR cooler 25. Next, the mixture discharged to the exhaust system is discharged to the exhaust pipe 7 via the UCC 8-2.

Referring to FIG. 4, the controller 30 determines that the pressure of the mixture exceeds the target intake system pressure by the detection signal (a) of the pressure sensor 27 through the air-blowing map 30-1, and detects the fuel-cut of the engine 1. Accordingly, a duty is controlled to be output to the EGR valve 23-1 and the dump valve 23-2. As a result, the EGR valve 23-1 and the dump valve 23-2 are opened together by the controlled duty. Consequently, after the mixture (high-pressure compressed air having a pressure larger than the target intake system pressure) is injected into the EGR pipe 21-1, the injected mixture is discharged to the intake system via the EGR valve 23-1 while being discharged to the exhaust system via the EGR cooler 25, thereby removing carbon or soot deposited in the EGR pipe 21-1, the EGR valve 23-1, and the EGR cooler 25. Next, the mixture discharged to the exhaust system is discharged to the exhaust pipe 7 via the UCC 8-2.

As described above, in the method of removing impurities from EGR by air blowing, when the current pressure of the mixture supplied to the engine 1 exceeds a target pressure, the air-blowing mode is performed such that the dump valve pipe 21-2 communicates with the EGR pipe 21-1, in which exhaust gas flows, allowing a portion of the mixture, serving as compressed air, to flow to the EGR pipe 21-1. Thus, impurities deposited in the EGR pipe 21-1, the EGR vale 23-1, and the EGR cooler 25 are removed using the high-pressure mixture, which is not used previously, and in particular air blowing is realized to prevent the carbon dioxide ($CO_2$) in the EGR pipe 21-1 from flowing into the intake system by applying fuel-cut as one of the vehicle operating conditions when the EGR valve 23-1 is opened.

The present invention has the following advantages and effects by applying an LP-EGR system, in which a dump valve path is connected to an EGR path, to a vehicle with a small displacement engine.

Firstly, it is possible to remove impurities, such as carbon or soot, deposited in an EGR valve, an EGR pipe, and an EGR cooler by a new air-blowing method different from an existing EGR valve chattering method, using the flow of compressed air in an intake system. Secondly, it is possible to remove impurities from EGR using high-pressure compressed air, which is not used previously, such that an intake system pressure higher than a target pressure acts on an EGR path through a dump valve path. Thirdly, since the performance of an LP-EGR system is always maintained as good as new by the improved method of removing impurities from EGR using high-pressure compressed air, it is possible to improve the fuel efficiency of the vehicle with the small displacement engine to a target level. Fourthly, it is possible to improve marketability as well as the performance of the vehicle with the small displacement engine though an improvement in fuel efficiency by LP-EGR. Fifthly, since the EGR valve, the EGR pipe, and the EGR cooler are kept clean without impurities deposited therein, it is possible to improve the durability of the LP-EGR system while maintaining the performance thereof. Sixthly, since an additional sensor or actuator is not applied to the LP-EGR system to remove impurities therefrom, it is possible to reduce costs. Seventhly, impurities are removed from the LP-EGR system by the dump valve path and a change in control logic without separate devices, and thus the prevent invention can be easily applied to existing vehicles with LP-EGR.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A method of removing impurities from exhaust gas recirculation (EGR) by air blowing, comprising:
   comparing a current intake system pressure with a target intake system pressure;
   checking an EGR valve opening condition of an EGR valve mounted at an EGR path when the current intake system pressure exceeds the target intake system pressure;
   opening the EGR valve and a dump valve mounted at a dump valve path connecting an intake system to the EGR path such that compressed air flows into the EGR path, when the EGR valve opening condition is satisfied; and
   closing the EGR valve and opening the dump valve mounted at the dump valve path connecting the intake system to the EGR path such that the compressed air flows into the EGR path, when the EGR valve opening condition is not satisfied,
   wherein the target intake system pressure is set based on an operating condition of an engine, and the operating condition is an accelerator pedal sensor stroke, an RPM of the engine, a gear-shift position, or a vehicle speed.

2. The method of claim 1, wherein the target intake system pressure is set based one of the accelerator pedal sensor stroke, the RPM, the gear-shift position, and the vehicle speed, or a combination thereof.

3. The method of claim 1, wherein the current intake system pressure is detected by a pressure sensor.

4. The method of claim 1, wherein the current intake system pressure is determined based on an air volume in the intake system, the RPM of the engine, a throttle position sensor angle, or an intake pressure.

5. The method of claim 4, wherein the current intake system pressure is determined based one of the air volume, the RPM, the throttle position sensor angle, and the intake pressure, or a combination thereof.

6. The method of claim 1, wherein the EGR valve opening condition is determined according to an EGR valve state variable, and the EGR valve state variable is fuel-cut of the engine, the RPM of the engine, or the vehicle speed.

7. The method of claim 6, wherein the EGR valve opening condition is determined based on one of the fuel-cut, the RPM, and the vehicle speed, or a combination thereof.

8. The method of claim 1, wherein, when the EGR valve and the dump valve are opened, the compressed air is discharged to the intake system and an exhaust system from the EGR path, and when the EGR valve is closed and the dump valve is opened, the compressed air is discharged to the exhaust system from the EGR path.

9. The method of claim 1, wherein when the current intake system pressure does not exceed the target intake system pressure, an air-blowing mode is not performed.

10. An exhaust gas recirculation (EGR) system comprising a controller configured to perform the method of claim 1, wherein the EGR system further comprises:
    an EGR pipe connecting the intake system, in which outside air is compressed to be a mixture and is supplied to the engine, to an exhaust system, to which exhaust gas from the engine is discharged;
    the dump valve path connecting the intake system to the EGR pipe;
    the EGR valve, opening and closing of which are controlled such that the EGR pipe communicates with the intake system, a portion of the exhaust gas, serving as EGR gas, being supplied to the intake system when the EGR valve is opened;
    the dump valve, opening and closing of which are controlled such that the EGR pipe communicates with the dump valve path, the mixture being converted into compressed air and supplied to the EGR pipe when the dump valve is opened; and
    an EGR cooler mounted in the EGR pipe to control temperature of the EGR gas.

11. A vehicle comprising:
    the intake system in which the compressed air is supplied to the engine;
    the exhaust system to which the exhaust gas is discharged from the engine;
    a turbocharger comprising a turbine rotated by the exhaust gas in the exhaust system, and a compressor for converting outside air in the intake system into compressed air; and
    the exhaust gas recirculation (EGR) system of claim 10.

12. The vehicle of claim 11, wherein the intake system is provided with a pressure sensor for detecting a pressure of the compressed air.

13. The vehicle of claim 11, wherein the EGR system is connected to the intake system at a front end of the compressor, the EGR path connected to the exhaust system is provided at a front end of Under-floor Catalytic Converter (UCC) through which the exhaust gas passes, and the EGR path communicates with the intake system through the dump valve path provided with the dump valve.

14. The vehicle of claim 13, wherein a Manifold Catalytic Converter (MCC) is mounted at the front end of the UCC in the exhaust system.

* * * * *